United States Patent
Bond

(10) Patent No.: US 6,691,763 B1
(45) Date of Patent: Feb. 17, 2004

(54) DIE MANUFACTURING

(75) Inventor: Robert James Bond, Hartebeespoort (ZA)

(73) Assignee: Rapid Design Technologies (PTY) Limited, Randburg (ZA)

( * ) Notice: Subject to any disclaimer, the term of this patent is extended or adjusted under 35 U.S.C. 154(b) by 7 days.

(21) Appl. No.: 10/089,944

(22) PCT Filed: Oct. 6, 2000

(86) PCT No.: PCT/ZA00/00182
§ 371 (c)(1),
(2), (4) Date: Jul. 2, 2002

(87) PCT Pub. No.: WO01/26498
PCT Pub. Date: Apr. 19, 2001

(30) Foreign Application Priority Data

Oct. 8, 1999 (ZA) .............................. 99/6374

(51) Int. Cl.[7] .............................................. B22D 46/00
(52) U.S. Cl. ......................................... 164/4.1; 164/76.1
(58) Field of Search ................................ 164/4.1, 76.1; 264/400, 113, 154, 219

(56) References Cited

U.S. PATENT DOCUMENTS

| 5,639,070 A | * | 6/1997 | Deckard | 264/497 |
| 5,658,506 A | * | 8/1997 | White et al. | 264/28 |
| 5,823,778 A | | 10/1998 | Schmitt | |
| 5,837,960 A | | 11/1998 | Lewis et al. | |
| 5,948,342 A | * | 9/1999 | Nakazawa et al. | 264/400 |
| 6,214,279 B1 | * | 4/2001 | Yang et al. | 264/482 |

FOREIGN PATENT DOCUMENTS

WO 9939889 8/1999

\* cited by examiner

*Primary Examiner*—M. Alexandra Elve
*Assistant Examiner*—Len Tlan
(74) *Attorney, Agent, or Firm*—Stevens, Davis, Miller & Mosher, LLP

(57) ABSTRACT

A system for producing a die includes means for generating a reference CAD model of a die of desired dimensions and a production facility arranged to produce an oversized casting of the die from a mould thereof. The system includes, further means for measuring the actual dimensions of the oversized casting, a comparator for comparing the measured dimensions of the oversized die against the reference CAD model, and a machining facility operable to machine the oversized casting until its dimensions are substantially the same as those of the reference CAD model.

16 Claims, 1 Drawing Sheet

DIE MANUFACTURING

FIELD OF THE INVENTION

This invention relates to a system and to a method for the manufacture and production of dies and, more specifically, but not exclusively, to a system and to a method for the production and manufacture of dies to be utilised in a wide range of production processes, such as injection moulding, gravity die casting and the like.

BACKGROUND TO THE INVENTION

A method and a system for producing a metal article such as a die is disclosed in applicant's South African Patent Application No. 99/2209, which is incorporated herein in its entirety by reference.

The disclosed method of producing a die includes the steps of:
  providing a CAD model of the die to be formed;
  rapid prototyping a three-dimensional patterns of the die from the CAD model thereof;
  producing mould of the die from the three-dimensional pattern thereof; and
  casting the die from the mould.

Whilst the applicant's method is effective and allows for the rapid production of new tooling, a number of difficulties have emerged. In particular, the castings produced in the casting step of the method exhibit a degree of metal shrinkage which is difficult to predict and which affects the accuracy of a final article which is to be produced by means of the die.

Further, texturing of the surface of such dies is difficult and costly to achieve. WO9939889 discloses a thermally efficient mold apparatus and method and U.S. Pat. No. 5,823,778 discloses an imaging method for fabricating dental devices. The inventions of these documents do not assist in resolving the above problems.

OBJECT OF THE INVENTION

It is an object of this invention to provide a system and a method for the production so of a die for moulding or forming a metal article which will, at least partially, alleviate the abovementioned difficulties and disadvantages.

SUMMARY OF THE INVENTION

In accordance with this invention there is provided a method for producing a die, comprising the steps of:
  providing a reference CAD model of the die of desired dimensions;
  producing an oversized casting of the die from a mould thereof;
  measuring the actual dimensions of the oversized casting;
  comparing the measured dimensions of the oversized die against the reference CAD model; and
  ablating the oversized casting until its dimensions are substantially the same as those of the reference CAD model.

Further features of the invention for producing an oversize casting of the die by the steps of:
  providing an oversize CAD model of the die;
  including in the oversize CAD model a number of reference points sufficient to define a three-dimensional co-ordinate system relative to the CAD model;
  rapid prototyping a three-dimensional pattern of the die from the oversize CAD model thereof;
  producing a mould of the die from the three-dimensional pattern thereof; and
  casting the oversize die from the mould.

Still further features of the invention provide for measuring the actual dimensions of the oversize casting by the steps of:
  imaging the oversize casting to obtain the co-ordinates of the surface of the oversize casting relative to the three dimensional co-ordinate system defined by the number of reference points on the casting; and
  converting the co-ordinates into a measured CAD model.

Yet further features of the invention provide for ablating the oversize casting by any one of the methods of laser ablation, machining or spark erosion, and for imaging the oversize casting by means of a laser-based, alternatively a contact-based imaging system.

There is also provided for the method to include the additional step of texturing at least a portion of the surface of the casting; and texturing at least a portion of the surface of the casting by:
  providing a reference CAD model of the desired texture to be applied to the surface of the casting;
  identifying the portion of the surface of the casting to be textured as a function of the co-ordinates of each one of the number of reference points on the casting; and
  ablating the identified portion of the surface of the casting in accordance with the reference CAD model of the desired texture to be applied to the casting.

There is further provided for ablating the portion of the surface of the casting by laser ablation.

There is further provided for including at least one integral cooling pathway through the oversize casting, and for the integral cooling pathway to also include a hollow back and a baffle to direct the flow of a coolant therethrough.

The invention extends to a system for producing a die comprising:
  means for generating a reference CAD model of a die of desired dimensions to be produced;
  a production facility arranged to produce an oversized casting of the die from a mould thereof;
  measuring means for measuring the actual dimensions of the oversized casting;
  comparator means for comparing the measured dimensions of the oversized die against the reference CAD model; and
  an ablating facility adapted to machine the oversized casting until its dimensions are substantially the same as those of the reference CAD model.

There is further provided for the production facility to include:
  means for generating an oversize CAD model of the die, containing a number of reference points sufficient to define a three-dimensional co-ordinate system relative to the CAD model;
  a rapid prototyping facility arranged to produce a three-dimensional pattern of the die from the oversize CAD model thereof; and
  a production means for producing a mould of the die from the three-dimensional pattern thereof, and for casting the die from the mould thereof.

There is still further provided for the measuring means to be an imaging system adapted to obtain the co-ordinates of the surface of the oversize casting relative to the three-dimensional co-ordinate system defined by the number of reference points on the casting, and to convert the co-ordinates into a measured CAD model.

There is yet further provided for the ablating facility to be any one of a laser ablating facility, a machining facility or a spark erosion facility and for the imaging system to be a laser-based, alternatively a contact-based imaging system.

There is also provided for the system to include a texturing means for texturing at least a portion of the surface of the casting, and for the texturing means to include:

means for generating a reference CAD model of a desired texture to be applied to the surface of the casting;

identification means for identifying the portion of the surface of the casting to be textured, as a function of the co-ordinates of each one of the number reference points on the casting; and an ablating facility adapted to ablate the identified portion of the surface of the casting in accordance with the reference CAD model of the desired texture to be applied to the casting.

There is also provided for the ablating facility to be a laser machining facility.

There is further provided for the oversize casting to include at least one integral pathway therethrough and for the pathway to include a hollow back and a baffle to direct a flow of coolant therethrough.

BRIEF DESCRIPTION OF THE DRAWINGS

A preferred embodiment of the invention is described below, by way of example only, and with reference to the accompanying drawings in which.

DETAILED DESCRIPTION OF THE INVENTION

Figure 1:
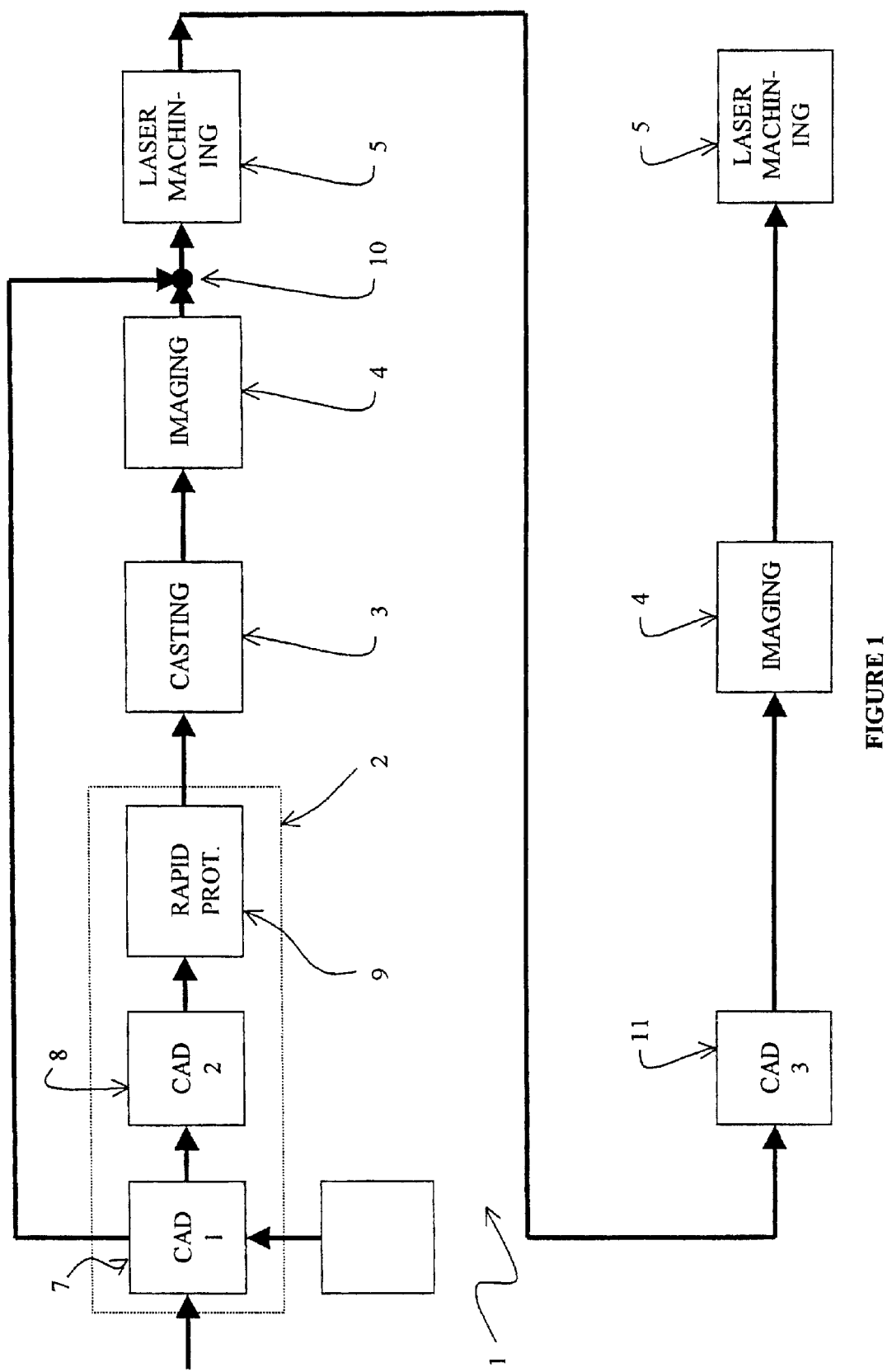
FIG. 1 is a schematic representation of a system for producing a die, according to the invention.

Referring to FIG. 1, a system for producing a die is indicated generally by reference numeral (1).

The system (1) includes a rapid prototyping facility indicated generally by reference numeral (2) and a production facility (3). The rapid prototyping facility (2) includes a CAD processor (not shown) and a Stereo Lithography (SL) machine (9). The rapid prototyping facility (2) and its operation is well known in the art and will not be described here in detail.

The CAD processor (7) produces data relating to a three-dimensional model of a die which is to be manufactured. The CAD model includes a number, preferably three, of reference points on the die sufficient to define a three-dimensional coordinate system relative to the die. These reference points are used as a basis for measuring the physical dimensions of a die produced in accordance with the CAD model as will be described in more detail below.

The production facility (3) includes a electroforming bath, an investment casting facility and a flash fire furnace (not shown), which are well known in the art.

The system (1) includes further a measuring means (4) in the form of a laser imaging system, which is commercially available from Brenckmann GmbH of Germany as well as an ablation facility (5) in the form of a laser machining system of the type which are well known in the art and which are commercially available from HK Technologies Laser Systems of the United Kingdom or LANG GmbH and Co. of Germany.

In use, a CAD model (7) is produced by the CAD processor (not shown) of a die of desired dimensions to be manufactured by the system. The CAD processor also produces an oversized CAD model (8) of the die to compensate for nominal shrinking during a casting step of the production process which will be described in greater detail below. A three-dimensional pattern of the oversized die is produced from the oversized CAD model (8) thereof by means of the SL machine (9). A mould of the die is then produced by the investment casting facility from the oversized three-dimensional pattern of the die, and a casting of the oversized die is produced from the mould by casting techniques which are well known in the art.

The dimensions of the oversized casting are measured by the laser imaging system (4) and converted to a CAD representation which is compared, at (10) with the nominally sized CAD model (7) of the die produced by the CAD processor to determine the deviation therefrom. The deviation, or error, is used as a control input for the ablation facility (5) to machine and remove material from the oversize casting until its dimensions conform to those of the desired size as reflected by the reference CAD model (7).

It will be appreciated by those skilled in the art that the system (1) and the method described above enable the production of accurately cast dies which are unaffected by regular nominal shrinkage experienced during the casting of such dies.

It is often desired to texture all or part of the surface of a die such as one produced by the system and method described above. The system (1) may be conveniently utilised to achieve such a result. In order to achieve this, the system provides for the CAD processor (not shown) to generate a reference CAD model (11) of a desired texture to be applied to the surface of the casting. In use, the imaging system (4) is also employed to identify a desired portion of the surface of the casting to be textured, as a function of the co-ordinates of each of the three reference points on the casting. The CAD processor is then used to compute the depth and scale of the texture to be applied to the surface of the casting and to control the laser head of the laser machining system (5) to ablate the identified portion of the surface of the casting such that the desired texture is applied to the casting as required.

Numerous modifications are possible to this embodiment without departing from the scope of the invention. In particular, the imaging system (4) may be a contact-based rather than a laser-based imaging system, and the laser machining system used for size reduction of the oversized casting maybe three-dimensional laser machining system, while that employed for texturing of the nominally sized casting may be a two-dimensional rather than a three-dimensional laser machining system. Further, size reduction of the oversize casting may be achieved by conventional machining or by spark erosion instead of laser ablation. Further, the oversize casting may be produced to include one or more integral pathways therethrough, each pathway having a hollow back and a baffle to direct a flow of coolant therethrough. When such hollow back dies are used in a production process, they will allow a shorter cycle time of the die to be achieved.

The invention therefore provides a system and a method for the production of dies which eliminates the need for accurate prediction and compensation of shrinkage during casting in prior art methods.

What is claimed is:

1. A method for producing a die, comprising the steps of:

providing a reference CAD model of the die of desired dimensions;

providing an oversize CAD model of the die;

including in the oversize CAD model a number of reference points sufficient to define a three-dimensional co-ordinate system relative to the CAD model;

producing an oversized casting of the die from a mould thereof;

imaging the oversized casting to obtain co-ordinates of the surface of the oversized casting relative to a three dimensional co-ordinate system defined by the said reference points on the casting;

converting the co-ordinates into a measured CAD model;

comparing the dimensions of the oversized casting, as contained in the measured CAD model, against the reference CAD model to determine a deviation therefrom; and ablating the oversized casting until its dimensions are substantially the same as those of the reference CAD model.

2. A method as claimed in claim 1, in which an oversized casting of the die is produced by the steps of:

rapid prototyping a three-dimensional pattern of the die from the oversize CAD model thereof;

producing a mould of the die from the three-dimensional pattern thereof; and casting the oversized die from the mould.

3. A method as claimed in claim 1, in which the oversized casting is ablated by means of any one of the methods of laser ablation, machining or spark erosion.

4. A method as claimed in claim 3, in which the oversized casting is imaged by means of a laser-based imaging system.

5. A method as claimed in claim 3, in which the oversized casting is imaged by means of a contact-based imaging system.

6. A method as claimed in claim 1, which includes the additional step of texturing at least a portion of the surface of the casting.

7. A method as claimed in claim 6, in which a portion of the surface of the casting is textured by:

providing a reference CAD model of the desired texture to be applied to the surface of the casting;

identifying the portion of the surface of the casting to be textured as a function of the co-ordinates of each one of said reference points on the casting; and ablating the identified portion of the surface of the casting in accordance with the reference CAD model of the desired texture to be applied to the casting.

8. A method as claimed in claim 7 in which the portion of the surface of the casting is ablated by means of laser ablation.

9. A system for producing a die comprising:

means for generating an oversize CAD model of the die, containing a number of reference points sufficient to define a three-dimensional coordinate system relative to the CAD model;

a production facility arranged to produce an oversized casting of the die from a mould thereof;

an imaging system adapted to obtain co-ordinates of the surface of the oversized casting relative to the three-dimensional co-ordinate system defined by the said points on the casting, and to convert the co-ordinates into a measured CAD model;

comparator means for comparing the dimensions of the oversized casting, as contained in the measured CAD model, against the reference CAD model to determine a deviation therefrom; and an ablation facility adapted to machine the oversized casting until its dimensions are substantially the same as those of the reference CAD model.

10. A system as claimed in claim 9, in which the production facility includes:

a rapid prototyping facility arranged to produce a three-dimensional pattern of the die from the oversize CAD model thereof; and a production means for producing a mould of the die from the three-dimensional pattern thereof, and for casting the die from the mould thereof.

11. A system as claimed in claim 9, in which the ablation facility is any one of a laser ablation facility, a machining facility or a spark erosion facility.

12. A system as claimed in claim 11, in which the imaging system is a laser-based imaging system.

13. A system as claimed in claim 11, in which the imaging system is a contact-based imaging system.

14. A system as claimed in claim 9, which includes a texturing means for texturing at least a portion of the surface of the casting.

15. A system as claimed in claim 14, in which the texturing means includes:

means for generating a reference CAD model of a desired texture to be applied to the surface of the casting;

identification means for identifying the portion of the surface of the casting to be textured, as a function of the co-ordinates of the said reference points on the casting; and an ablation facility adapted to ablate the identified portion of the surface of the casting in accordance with the reference CAD model of the desired texture to be applied to the casting.

16. A system as claimed in claim 15, in which the ablation facility is a laser machining facility.

* * * * *